United States Patent
Wang

(10) Patent No.: US 9,857,537 B2
(45) Date of Patent: *Jan. 2, 2018

(54) DEVICE FOR DISTRIBUTING HYBRID CABLE AND TRANSITIONING FROM TRUNK CABLE TO JUMPER CABLE

(71) Applicant: CommScope Technologies LLC, Hickory, NC (US)

(72) Inventor: Chi-ming Wang, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,436

(22) Filed: Feb. 15, 2017

(65) Prior Publication Data

US 2017/0160489 A1 Jun. 8, 2017

Related U.S. Application Data

(63) Continuation of application No. 14/448,269, filed on Jul. 31, 2014, now Pat. No. 9,606,320.

(60) Provisional application No. 61/936,636, filed on Feb. 6, 2014.

(51) Int. Cl.
*G02B 6/38* (2006.01)
*G02B 6/44* (2006.01)

(52) U.S. Cl.
CPC ......... *G02B 6/3817* (2013.01); *G02B 6/3825* (2013.01); *G02B 6/4416* (2013.01); *G02B 6/4471* (2013.01)

(58) Field of Classification Search
CPC .. G02B 6/3817; G02B 6/3825; G02B 6/4416; G02B 6/4471
See application file for complete search history.

(56) References Cited

U.S. PATENT DOCUMENTS

| | | | |
|---|---|---|---|
| 6,711,337 B2 | 3/2004 | Hodge et al. | |
| 7,837,397 B2 | 11/2010 | Fingler et al. | |
| 8,401,387 B2 | 3/2013 | Biegert et al. | |
| 9,606,320 B2 * | 3/2017 | Wang | G02B 6/4471 |
| 2006/0093303 A1 * | 5/2006 | Reagan | G02B 6/4466 385/135 |

(Continued)

FOREIGN PATENT DOCUMENTS

| | | |
|---|---|---|
| WO | WO 2013/063045 A1 | 5/2013 |
| WO | WO 2013/165831 A1 | 11/2013 |

OTHER PUBLICATIONS

International Search Report and Written Opinion for corresponding PCT Application No. PCT/US2015/014347, dated May 15, 2015.

(Continued)

*Primary Examiner* — Ryan Lepisto
(74) *Attorney, Agent, or Firm* — Myers Bigel, P.A.

(57) ABSTRACT

A device for connecting a hybrid trunk cable to one or more jumper cables includes: an enclosure having two opposed end walls and two opposed side walls; a power connector mounted to a first end wall; a fiber optic connector mounted to the first end wall; and a plurality of mixed media connectors mounted to a first side wall. The power connector is electrically connected to the plurality of mixed media connectors, and the fiber optic connector is optically connected to the plurality of mixed media connectors.

10 Claims, 5 Drawing Sheets

(56) References Cited

U.S. PATENT DOCUMENTS

| | | |
|---|---|---|
| 2009/0226181 A1 | 9/2009 | Fingler et al. |
| 2011/0097052 A1* | 4/2011 | Solheid ................ G02B 6/445 |
| | | 385/135 |
| 2012/0008257 A1 | 1/2012 | Rebers et al. |
| 2012/0295486 A1 | 11/2012 | Petersen et al. |
| 2013/0084050 A1 | 4/2013 | Vastmans et al. |
| 2013/0088407 A1 | 4/2013 | King et al. |
| 2013/0108227 A1* | 5/2013 | Conner ................ G02B 6/4471 |
| | | 385/101 |

OTHER PUBLICATIONS

Supplemental European Search Report corresponding to European Application No. 15746886.9, dated Aug. 22, 2017.

* cited by examiner

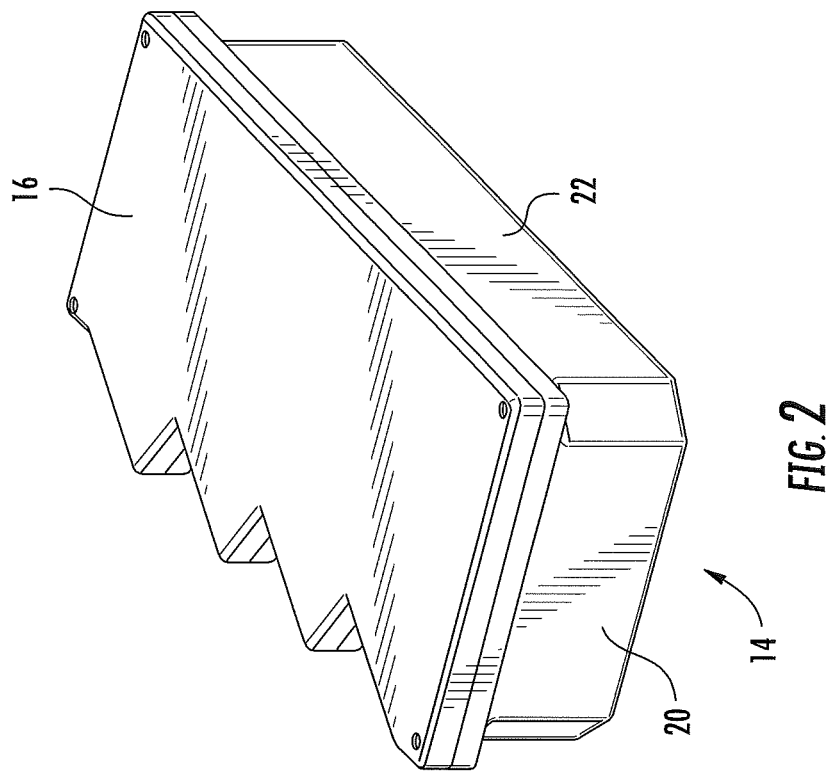
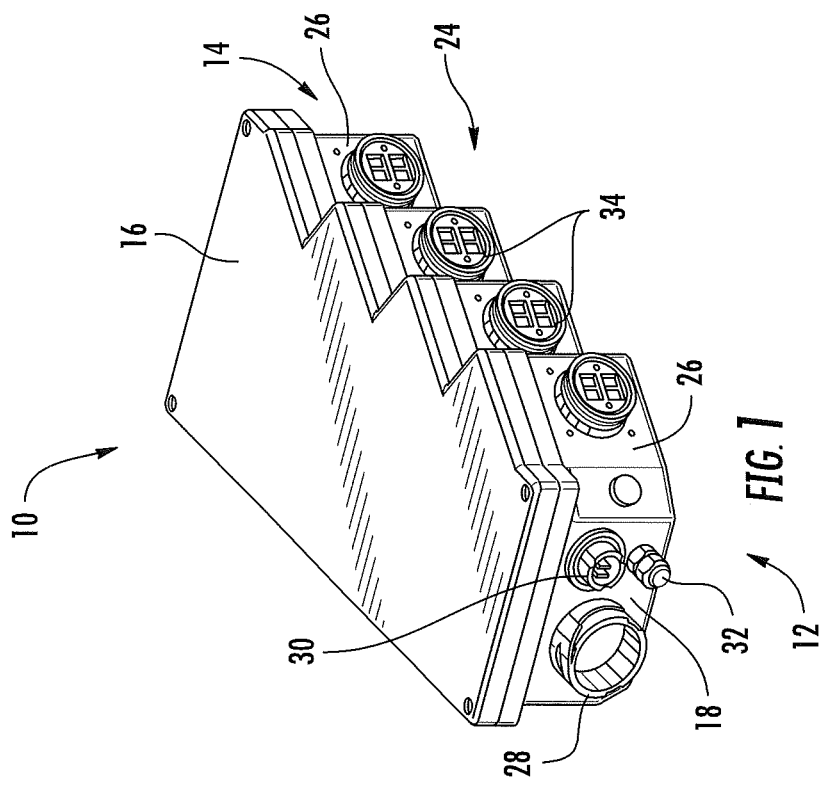

DEVICE FOR DISTRIBUTING HYBRID CABLE AND TRANSITIONING FROM TRUNK CABLE TO JUMPER CABLE

RELATED APPLICATION

The present application is a continuation application of U.S. patent application Ser. No. 14/448,269, filed Jul. 31, 2014, which claims priority from and the benefit of U.S. Provisional Patent Application No. 61/936,636, filed Feb. 6, 2014, the disclosure of which is hereby incorporated by reference herein in its entirety.

FIELD OF THE INVENTION

The present invention relates generally to power and signal distribution, and more particularly to distribution from hybrid cables.

BACKGROUND

Latest developments in technology for delivering power and data in wireless infrastructure use hybrid cables, wherein the term "hybrid cable" is intended to mean a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable. However, in order to use a single hybrid trunk cable, at some point the trunk cable must transition to hybrid jumper cables. Typically, these are distributed inside an enclosure that transitions the trunk conductor gauge to the jumper conductor gauge and connects the optical fibers in the trunk to the optical fibers in the jumper cables. Currently, transitions are achieved by making connections inside the enclosure, requiring it to be opened, cables to be fed/mated to the enclosure, and power and fiber connections to be made, all in the field (e.g., on the top of cell sites near a remote radio unit (RRU)). This practice can create many issues for installers, including time, safety, connection errors (such as loose power connections and/or poor fiber cleaning), and more opportunity for connector damage.

SUMMARY

As a first aspect, embodiments of the invention are directed to a device for connecting a hybrid trunk cable to one or more jumper cables. The device comprises: an enclosure having two opposed end walls and two opposed side walls; a power connector mounted to a first end wall; a fiber optic connector mounted to the first end wall; and a plurality of mixed media connectors mounted to a first side wall. The power connector is electrically connected to the plurality of mixed media connectors, and the fiber optic connector is optically connected to the plurality of mixed media connectors.

As a second aspect, embodiments of the invention are directed to a device for connecting a hybrid trunk cable to one or more jumper cables, comprising: an enclosure having two opposed end walls and two opposed side walls; a hybrid cable entering a first end wall, the hybrid cable having one or more conductors and a plurality of optical fibers; and a plurality of mixed media connectors mounted to a first side wall. The conductor of the hybrid cable is electrically connected to the plurality of mixed media connectors, and wherein each of the plurality of optical fibers is optically connected to respective ones of the plurality of mixed media connectors.

BRIEF DESCRIPTION OF THE FIGURES

FIG. 1 is a front perspective view of a device for joining the optical fibers and power conductor of a hybrid cable to jumper cables according to embodiments of the invention.

FIG. 2 is a rear perspective view of the device of FIG. 1.

DETAILED DESCRIPTION

Figure 4:
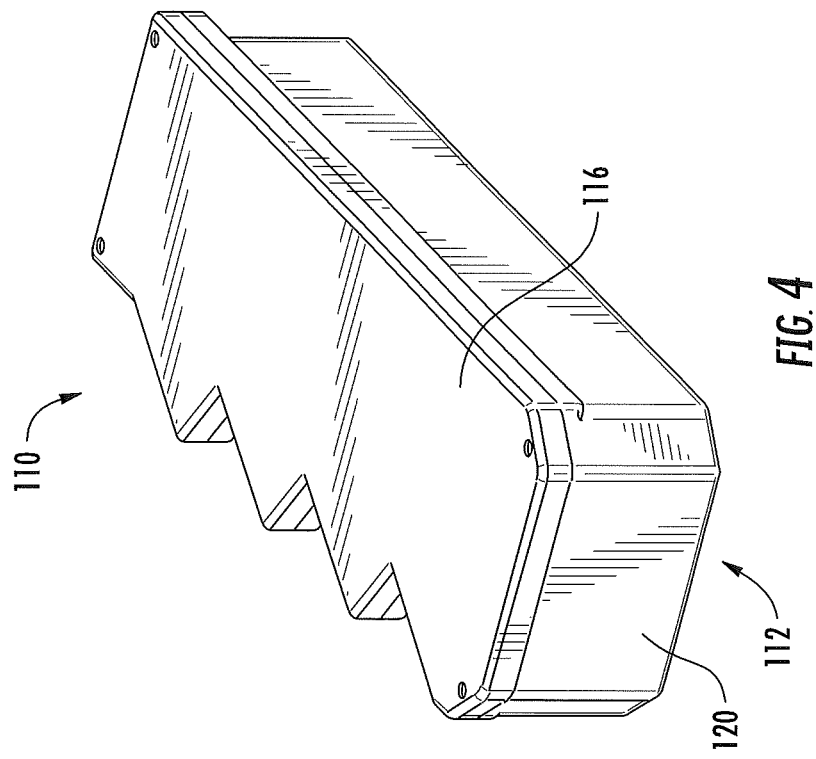
FIG. 4 is a rear perspective view of the device of FIG. 3.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the figures, a device for interconnecting a hybrid trunk cable with jumper cables is illustrated in FIGS. 1 and 2 and designated broadly at 10. The device 10 comprises a exterior enclosure 12 (typically formed of a thermoplastic) that includes a housing 14 and a cover 16. The housing 14 includes a floor (not seen in FIGS. 1 and 2), opposed end walls 18, 20, a straight side wall 22 and a stepped side wall 24. The stepped side wall 24 includes four mounting panels 26, each of which is disposed at an oblique angle (typically between about 45 and 70 degrees) relative to the end walls 18, 20. The corners between respective merging side walls 22, 24 and end walls 18, 20 are beveled in the illustrated embodiment. The cover 16 is configured to fit over and rest on the housing 14, and may be attached thereto with screws or other fasteners, adhesives or the like. Those skilled in this art will appreciate that the enclosure may take other configurations, such as a split "clamshell" or the like.

A power connector 28, such as a connector with a pin and socket configuration, is mounted on the end wall 18. The power connector 28 is configured to receive a mating connector attached to the end of the power conductor of a hybrid cable. Similarly, a fiber optic connector 30, such as an MPO connector, is mounted on the end wall 18 adjacent to the power connector 28. The fiber optic connector 30 is configured to receive a mating connector attached to the end of the fiber optic cables of the hybrid cable. An electrical grounding site 32 is also mounted on the end wall 18.

Four mixed media connectors 34 are mounted on the stepped side wall 24, one on each of the mounting panels 26. The mixed media connectors 34 are configured to receive connectors for jumper cables, such as LC connectors and power pins. The mixed media connectors 34 are electrically connected to the power connector 28 and optically connected to the fiber optic connector 30 via known methods, such as a fiber optic fanout unit and a power conductor breakout unit, that are stored within the enclosure 12.

The utility of the device 10 can be understood from the ensuing discussion. Latest developments in technology for delivering power and data in wireless infrastructure use hybrid cables as discussed above. Unlike RF-based systems, a single hybrid trunk cable can be used to power multiple sectors, thereby eliminating multiple runs of RF cable. However, in order to use a single hybrid trunk cable, at some point the trunk cable must transition to hybrid jumper cables. Typically, these are distributed inside an enclosure that transitions the trunk conductor gauge to the jumper conductor gauge and connects the optical fibers in the trunk to the optical fibers in the jumper cables. Currently, transitions are achieved by making connections inside the enclosure, requiring it to be opened, cables to be fed/mated to the enclosure, and power and fiber connections to be made, all in the field (e.g., on the top of cell sites near a remote radio unit (RRU)). This practice can create many issues for installers, including time, safety, connection errors (such as loose power connections and/or poor fiber cleaning), and more opportunity for connector damage.

Use of the device 10 can decrease or eliminate these issues. The device 10 can allow both the hybrid trunk and jumper cables to be connected to the outside of the enclosure 12. The mixed media connectors for the jumpers can enable a single connection to be made for each jumper using LC fiber connectors and power pins. Paired with the trunk connectors 28, 30, this allows for a fully connected enclosure 12 that never needs to be opened. Also, with mating being as simple as mating two connectors rather than dealing with the actual copper and LC connectors themselves, field installation time can be drastically reduced, and poor connections and any danger of doing complex tasks atop a tower can be eliminated. Also, the components (trunk, enclosure, and jumper cables) can be easily swapped out.

Several features should be highlighted. The single mixed media connector 34 for each jumper can allow the thickness of the enclosure 12 (i.e., the distance between the floor and cover 16) to be relatively small. Obliquely angling the mixed media connectors 34 relative to the end walls 18, 20 allows the enclosure 12 to be much narrower between the side walls 22, 24 while still ensuring that water will not pool at the jumper connector seals. The angled orientation of the mixed media connectors 34 also allows jumper cables to be routed more easily to the RRU. Moreover, this design also takes advantage of its shape and the interior room for routing by creating a 4RRU unit that may be paired with a mirrored version of itself (i.e., with the straight side walls 22 being paired back-to-back) to produce a composite 8 RRU unit, while still taking up minimal (and valuable) tower space. This may be important because it can enable the user to expand its capability without increasing the transition enclosure footprint significantly (if at all), whether the enclosure is mounted to a tower on which space is being rented or within limited space on a superstructure.

Figure 3:
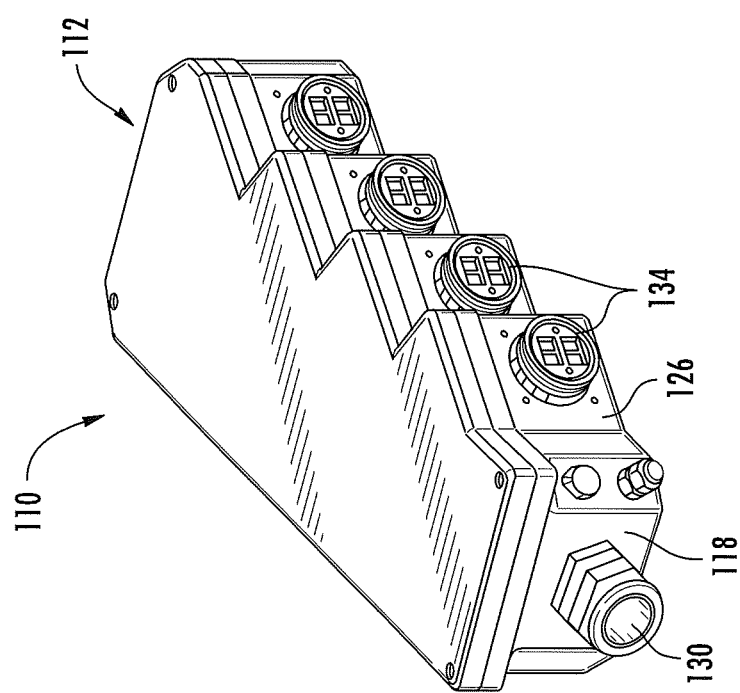
FIG. 3 is a front perspective view of a device for joining the optical fibers and power conductor of a hybrid cable to jumper cables according to additional embodiments of the invention.

Referring now to FIGS. 3 and 4, another device according to alternative embodiments of the invention, designated broadly at 110, is shown therein. The device 110 is similar to the device 10 in that it (a) includes angled mounting panels 126 that allow for a more narrow design, (b) can be paired with a mirrored sister enclosure to expand capacity while saving space, and (c) employs mixed media jumper connectors 134. However, instead of having trunk connectors 28, 30, a trunk cable (not shown) is integrated into the enclosure 112 via a gland 130 and securing mechanism (such as a hose clamp) mounted to the end wall 118, an epoxy joint, or another attachment method. The conductors and optical fibers of the trunk cable can be attached directly to the mixed media connectors within the enclosure 112. Although this configuration precludes the option of swapping out the trunk cable or enclosure separately, it may decrease cost. Additionally, an integrated solution such as this can decrease cost due to less expensive connection cost and at least less connection point in the system. Fiber performance may also be improved due to fewer termination and connection points.

With this configuration, the trunk cable may be pulled up the tower with the enclosure 112 attached. This can eliminate any need to connect the trunk cable while perched on the top of the tower, leaving just the jumper cables to be connected via the mixed media connectors 134.

In order to facilitate installation, the design of the enclosure 112 may be altered somewhat from that of the enclosure 12. For example, it may be as narrow as possible to aid in drawing it upwardly to the tower top with the trunk cable (a narrower enclosure 112 may also reduce wind load). The edges may be rounded and the end wall 120 may be curved (or even dome-like) to prevent snagging on objects.

To keep the enclosure upright during the trunk pull, a fastening feature may be mounted on or near the end wall 120; examples include a cable connected to the two lid screws at the top of the enclosure 112; or a molded hook/ring in the end wall 120 or the cover 116. Such a fastening feature may maintain the device 110 upright during the pull to prevent more strain on the trunk-enclosure connection and the wiring within. Fastening features may be mounted in other locations in other embodiments.

Figure 5:
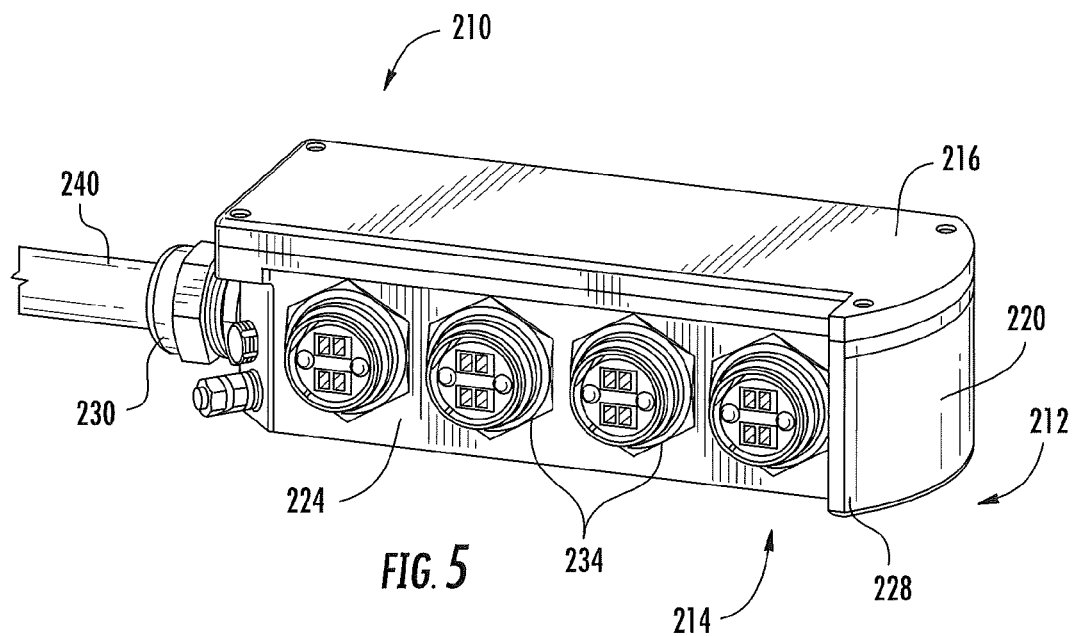
FIG. 5 is a right front perspective view of a device for joining the optical fibers and power conductor of a hybrid cable to jumper cables according to further embodiments of the invention.
Figure 6:
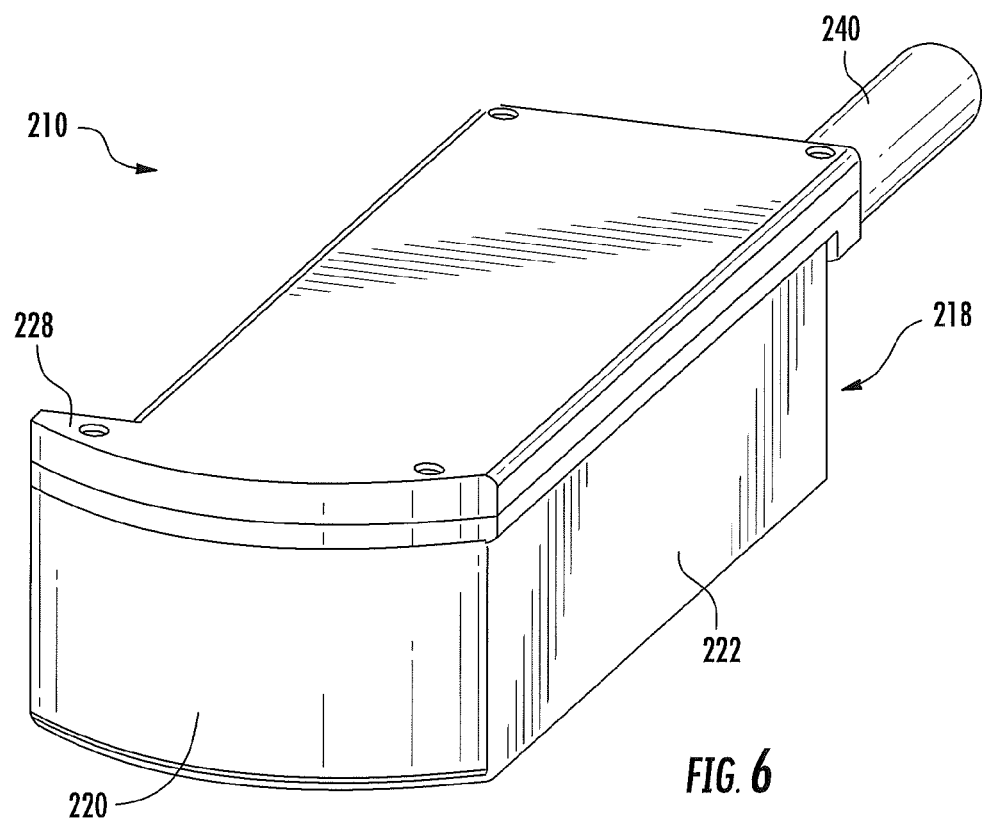
FIG. 6 is a left front perspective view of the device of FIG. 5.

Referring now to FIGS. 5 and 6, another device according to alternative embodiments of the invention, designated broadly at 210, is illustrated therein. The device 210 comprises a exterior enclosure 212 (typically formed of a thermoplastic) that includes a housing 214 and a cover 216.

The housing 214 includes a floor (not seen in FIGS. 5 and 6), a straight end wall 218, an arced end wall 220, and straight side walls 222, 224. The corners between merging side walls 222, 224 and the end wall 218 are beveled in the illustrated embodiment. A canopy 228 projects away from the side wall 224 and the arced end wall 220 and overhangs the side wall 224. The cover 216 is configured to fit over and rest on the housing 214, and may be attached thereto with screws or other fasteners, adhesives or the like. Those skilled in this art will appreciate that the enclosure may take other configurations, such as a split "clamshell" or the like.

As in the embodiment shown in FIGS. 3 and 4, a trunk cable 240 is integrated into the enclosure 212 via a gland 230 and securing mechanism (such as a hose clamp) mounted to the end wall 218, an epoxy joint, or another attachment method. Four mixed media connectors 234 are mounted on the side wall 224. The presence of the canopy 228 can protect the mixed media connectors 228 from damage during installation as the trunk cable 240 is pulled up an antenna tower or other structure for mounting; because the device 210 is maintained in an upright position (i.e., with the arced end wall 220 facing upwardly), the overhang provided by canopy 228 can prevent the mixed media connectors 234 from striking other structures as the device 210 is raised.

Notably, like the devices 10, 110, the device 210 can also be arranged with a mirror image device, with the side walls 222 of each device adjacently confronting or even abutting each other, such that two devices to produce a "composite" 8 RRU unit, while still taking up minimal tower space.

It should also be noted that the device 210 may include a power connector and a fiber optic connector (such as those shown at 28 and 30 in FIGS. 1 and 2) rather than the gland 230.

Figure 7:
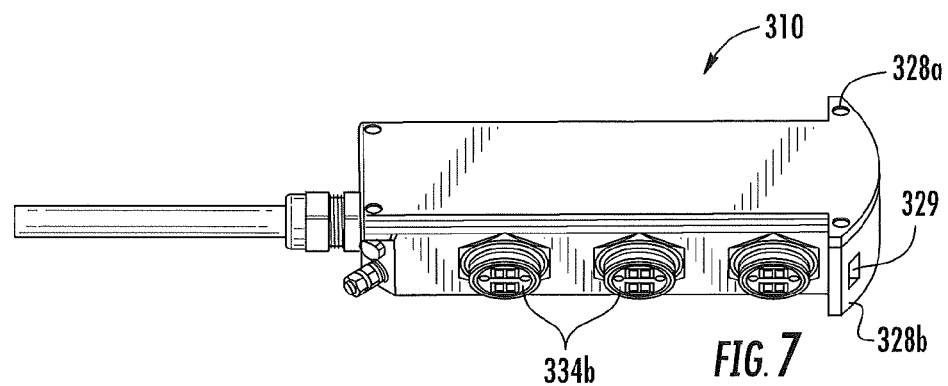
FIG. 7 is a right side perspective view of a device for joining the optical fibers and power conductor of a hybrid cable to jumper cables according to still further embodiments of the invention.
Figure 8:
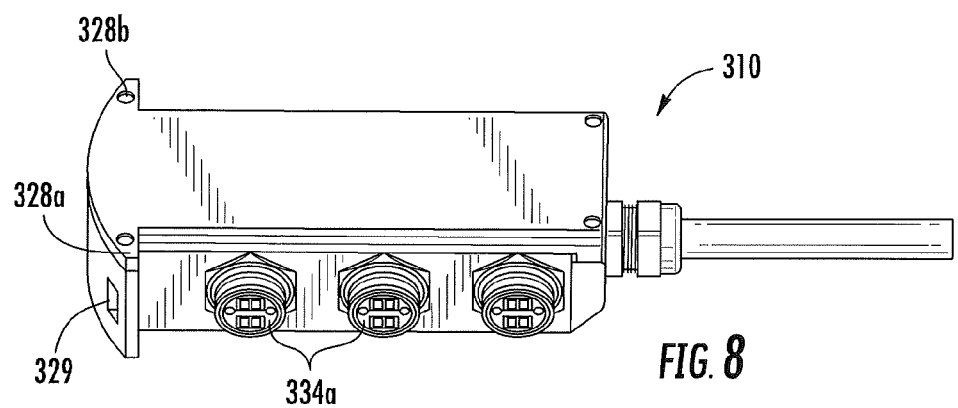
FIG. 8 is a left side perspective view of the device of FIG. 7.
Figure 9:
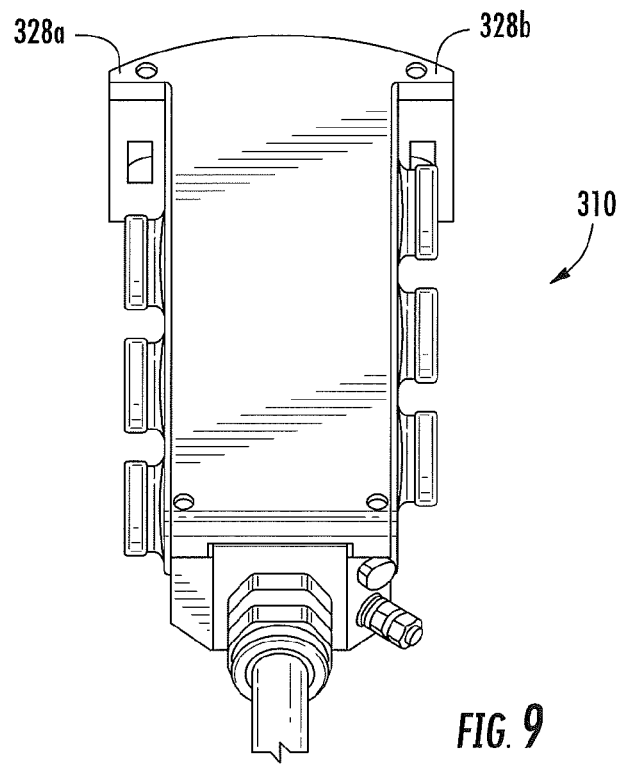
FIG. 9 is an end perspective view of the device of FIG. 7.

Referring now to FIGS. 7-9, another device, designated broadly at 310, is illustrated therein. The device 310 is similar to the device 210 shown in FIGS. 5 and 6, but includes two canopies 328a, 328b that extend from opposite ends of the arced wall 320 to overhang respective side walls 322, 324. Three mixed media connectors 334a, 334b are mounted on both side walls 333, 324 in the illustrated embodiment such that the canopies 328a, 328b can protect them during installation, although in some embodiments mixed media connectors may also may mounted on only one side wall 322, 324. Additional canopies (e.g., extending perpendicularly from the floor) may also be included that may protect mixed media connectors mounted to other walls of the device 310.

Also, each of the canopies 328a, 328b includes a respective slot 329 as a fastening feature. The slots 329 can receive a wire or string (not shown) routed therethrough that can be employed to hoist the device 310 upwardly during installation. The presence of two slots 329 can enable the device 310 to remain upright as it is hoisted. In some embodiments, the slots 329 may be omitted and the device hoisted by routing a rope or string under both of the canopies 328a, 328b to maintain the device in an upright orientation.

Like the device 210, the device 310 may include a power connector and a fiber optic connector (such as those shown at 28 and 30 in FIGS. 1 and 2) rather than the gland 230.

Figure 10:
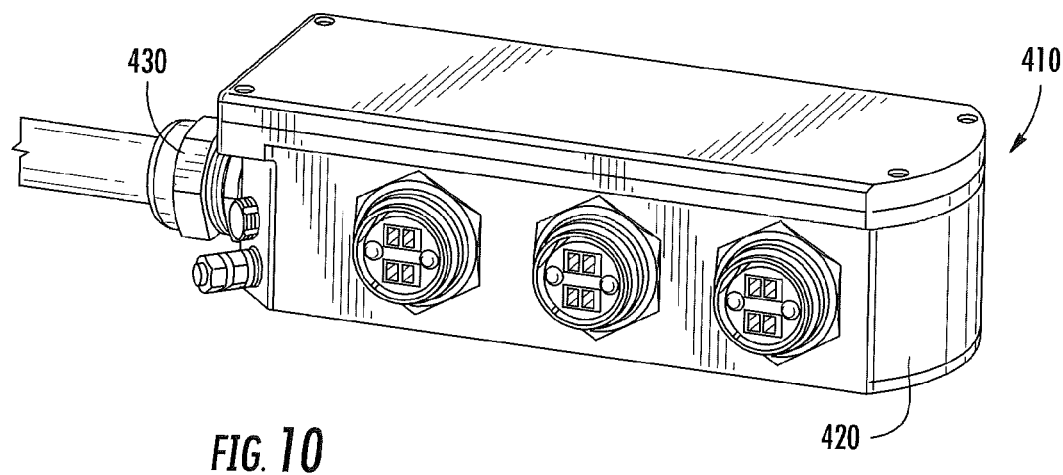
FIG. 10 is a left front perspective view of a device for joining the optical fibers and power conductors of a hybrid cable to jumper cables according to yet further embodiments of the invention.
Figure 11:
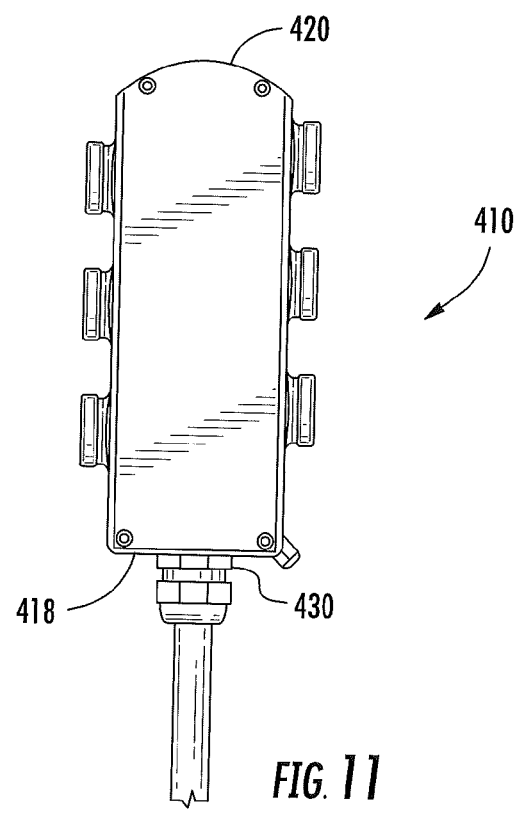
FIG. 11 is a top view of the device of FIG. 10.

Referring now to FIGS. 10 and 11, another device, designated broadly at 410, is shown therein. The device 410 is very similar to the device 310 with the exception that the there are no canopies included in the arced wall 420. The presence of the arced wall 420 opposite the entry point of the gland 430 in the end wall 418 can facilitate hoisting of the device 410 through cables and other structures.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What which is claimed is:

1. A device for connecting a hybrid trunk cable to one or more jumper cables, comprising:
    an enclosure having first and second opposed end walls and first and second opposed side walls;
    a hybrid cable entering the first end wall, the hybrid cable having a plurality of conductors and a plurality of optical fibers; and
    a plurality of first mixed media connectors mounted to the first side wall, wherein each of the first mixed media connectors includes a port for an electrical connection and a port for an optical connection;
    wherein the conductors of the hybrid cable are electrically connected to respective ones of the plurality of first mixed media connectors, and wherein each of the plurality of optical fibers is optically connected to respective ones of the plurality of first mixed media connectors;
    and wherein the second end wall includes a first canopy that overhangs the first side wall.

2. The device defined in claim 1, wherein the first side wall is substantially planar.

3. The device defined in claim 1, further comprising a plurality of second mixed media connectors mounted to the second side wall, wherein each of the second mixed media connectors includes a port for an electrical connection and a port for an optical connection.

4. The device defined in claim 1, further comprising a fastening feature mounted adjacent the second end wall of the enclosure, the fastening feature configured to maintain the enclosure in an upright orientation, with the second end wall facing upwardly, as the device is raised up an antenna tower.

5. The device defined in claim 4, wherein the second end wall further includes a second canopy that overhangs the second side wall.

6. The device defined in claim 4, wherein the first canopy includes a fastening feature.

7. The device defined in claim 1, wherein the second end wall is arced.

8. The device defined in claim 1, electrically and optically connected with a remote radio unit.

9. A device for connecting a hybrid trunk cable to one or more jumper cables, comprising:
    an enclosure having first and second opposed end walls, first and second opposed substantially planar side walls, and front and rear walls, the front and rear walls being parallel with each other;
    a hybrid cable entering the first end wall, the hybrid cable having a plurality of conductors and a plurality of optical fibers; and
    a plurality of first mixed media connectors mounted to the first side wall, wherein each of the first mixed media connectors includes a port for an electrical connection and a port for an optical connection;

a plurality of second mixed media connectors mounted to the second side wall, wherein each of the second mixed media connectors includes a port for an electrical connection and a port for an optical connection;

wherein the conductors of the hybrid cable are electrically connected to respective ones of the plurality of first and second mixed media connectors, and wherein each of the plurality of optical fibers is optically connected to respective ones of the plurality of first and second mixed media connectors;

wherein the ports of the first mixed media connectors are oriented to receive jumper cables from a first direction normal to the first side wall, and the ports of the second mixed connectors are oriented to receive jumper cables front a second direction normal to the second side wall, the first direction being opposed to the second direction.

10. The device defined in claim 9, electrically and optically connected with a remote radio unit.

\* \* \* \* \*

UNITED STATES PATENT AND TRADEMARK OFFICE
CERTIFICATE OF CORRECTION

PATENT NO. : 9,857,537 B2  
APPLICATION NO. : 15/433436  
DATED : January 2, 2018  
INVENTOR(S) : Wang Page 1 of 1

It is certified that error appears in the above-identified patent and that said Letters Patent is hereby corrected as shown below:

In the Claims

Column 7, Claim 9, Line 15: Please correct "front a second direction" to read -- from a second direction --

Signed and Sealed this
Twenty-second Day of May, 2018

Andrei Iancu
*Director of the United States Patent and Trademark Office*